United States Patent [19]

Lavin

[11] Patent Number: 5,868,199
[45] Date of Patent: Feb. 9, 1999

[54] METHOD AND APPARATUS FOR REBOILING A LIQUEFIED GAS MIXTURE

[75] Inventor: John Terence Lavin, Guildford, United Kingdom

[73] Assignee: The BOC Group plc, Windlesham, England

[21] Appl. No.: 404,666

[22] Filed: Mar. 15, 1995

[30] Foreign Application Priority Data

Mar. 16, 1994 [GB] United Kingdom .................... 9405161

[51] Int. Cl.⁶ .......................................... F28F 3/00
[52] U.S. Cl. .............................. 165/166; 62/643; 62/903; 62/924
[58] Field of Search ............................... 165/166; 62/924, 62/903, 643

[56] References Cited

U.S. PATENT DOCUMENTS

| | | | |
|---|---|---|---|
| 3,108,867 | 10/1963 | Dennis | 62/924 X |
| 3,127,260 | 3/1964 | Smith | 62/924 X |
| 3,568,462 | 3/1971 | Hoffman et al. | 165/166 X |
| 3,992,168 | 11/1976 | Toyama et al. | 165/166 X |
| 4,715,433 | 12/1987 | Schwarz et al. | 165/166 X |
| 4,784,677 | 11/1988 | Al-Chalabi | 62/924 X |
| 4,838,913 | 6/1989 | Victor et al. | 62/924 X |
| 5,079,923 | 1/1992 | Grenier | 62/924 X |
| 5,100,448 | 3/1992 | Lockett et al. | 62/924 X |
| 5,122,174 | 6/1992 | Sunder et al. | 165/166 X |
| 5,159,816 | 11/1992 | Kovak et al. | 62/924 X |
| 5,197,296 | 3/1993 | Prosser et al. | 62/924 X |
| 5,224,351 | 7/1993 | Jeannot et al. | 165/166 X |
| 5,237,823 | 8/1993 | Cheung et al. | 62/924 X |
| 5,275,003 | 1/1994 | Agrawal et al. | 62/924 X |
| 5,313,800 | 5/1994 | Howard et al. | 62/924 X |
| 5,316,628 | 5/1994 | Collin et al. | 165/166 X |
| 5,333,683 | 8/1994 | Arriulou et al. | 165/166 |

*Primary Examiner*—Ira S. Lazarus
*Assistant Examiner*—Christopher Atkinson
*Attorney, Agent, or Firm*—David M. Rosenblum; Salvatore P. Pace

[57] ABSTRACT

A liquefied gas mixture comprising at least two components of which one is more volatile than the other or others is boiled in an apparatus including stripping passages for vaporising part of a flow of the mixture. The passages are arranged alternately with condensing passages. The stripping passages each have at least one heat exchange surface which is heated to a temperature which causes the liquid to boil and along which the liquefied gas mixture flows in countercurrent mass exchange relationship with a vapour flow evolved from such liquid. The more volatile component is progressively stripped from the liquefied gas mixture such that the vapour flow is enriched in its direction of flow in the more volatile component and the mixture itself is depleted of the more volatile component in its direction of flow. Accordingly, separation of the mixture takes place in addition to its boiling. The apparatus can be employed as a reflux condenser for an argon distillation column connected to a lower pressure column of a double column air separation unit. Condensation in such apparatus can be effected while separating oxygen-rich liquid produced in a higher pressure column. The products of such separation can then be introduced into the lower pressure column to reduce the separation work that would otherwise have to be performed in the lower pressure column.

10 Claims, 2 Drawing Sheets

METHOD AND APPARATUS FOR REBOILING A LIQUEFIED GAS MIXTURE

BACKGROUND OF THE INVENTION

This invention relates to a method and apparatus for reboiling a liquefied gas mixture comprising at least two components, of which one is more volatile than the other.

One example of a need in gas separation to reboil a liquefied gas mixture arises in the separation of air. For example, it is conventional in air separation processes that produce an argon product to cool by means of a stream of oxygen-enriched liquid air a condenser associated with a rectification column in which a crude argon product is produced. The oxygen-enriched liquid air is itself at least partially reboiled by condensing crude argon vapour. The resulting vapour is typically separated in another rectification column into oxygen-rich and nitrogen-rich fractions.

It is an aim of the present invention to provide a method and apparatus for reboiling a liquefied gas mixture which offers the possibility of reducing the thermodynamic work of separation required in a downstream rectification column.

SUMMARY OF THE INVENTION

According to the present invention there is provided apparatus for reboiling a liquefied gas mixture comprising at least two components, of which one is more volatile than the other or others, the apparatus including stripping passages each having at least one heat transfer surface which is able to be heated to a temperature which causes the liquefied gas mixture to boil and along which said liquefied gas mixture is able to flow in countercurrent mass exchange relationship with a vapour flow evolved from such liquid, whereby the more volatile component is able to be progressively stripped from the liquefied gas mixture such that the said vapour flow is enriched in the direction of its flow in the more volatile component and the said liquefied gas mixture is depleted in its direction of flow of the more volatile component, means for creating said flow of the liquefied gas mixture, means for heating said heat transfer surface to the boiling temperature, a first outlet for the enriched vapour, and a second outlet for the depleted liquid.

The invention also provides a method of reboiling a liquefied gas mixture comprising at least two components, of which one is more volatile than the other or others, the method including the steps of creating a flow of liquefied gas mixture along at least one heat transfer surface; heating said heat transfer surface so as to cause vapour to be evolved from the flow of liquefied gas mixture; causing the vapour to flow in countercurrent mass exchange relationship with the flowing liquefied gas mixture whereby the more volatile component is progressively stripped from the liquefied gas mixture such that the vapour is enriched in the direction of its flow in the more volatile component and the liquefied gas mixture is depleted in the direction of its flow of the more volatile component, and withdrawing from the mass exchange a stream of liquefied gas mixture depleted of the more volatile component and a stream of vapour enriched in the more volatile component.

Preferably the liquefied gas mixture comprises oxygen, nitrogen and argon. Accordingly the liquefied gas mixture flow is depleted of nitrogen and the vapour flow is enriched in nitrogen.

The stripping passages are preferably disposed vertically. Such an arrangement enables the liquefied gas mixture to flow down the heat transfer surface under gravity preferably in the form of a thin film. If the stripping passages are arranged vertically, the first outlet preferably communicates with an uppermost region thereof and the second outlet with a lowermost region thereof.

The stripping passages are preferably arranged alternately with condensing passages. The stripping passages and condensing passages preferably share common walls. Passage of a gas or vapour to be condensed through the condensing passages causes heat to be extracted via the heat transfer surfaces from the gas or vapour by the liquefied gas mixture. Each heat transfer surface preferably has cavities or other irregularities which provide nucleation sites for formation of vapour bubbles and/or may have fins associated therewith. Preferably, each such surface comprises a porous metal coating of the kind in which the pores are open and therefore communicate with one another. Such a porous coating encourages a homogeneous distribution of a film of liquefied gas over the surface. The coating may be of the same or a different composition from the surface to which it is applied. Preferably, the coating is formed by depositing a mixture of particles of the desired metal or metal alloy and particles of a suitable plastics material (or particles of a performed composite of the metal and the plastics material) onto a substrate so as to form a coating comprising plastics material embedded in the metal, the resulting coating then being heated to volatilise the plastics material so as to leave a porous metal coating including a multitude of irregular, interconnected, re-entrant cavities. The plastics-metal coating may be deposited by plasma spraying in accordance with our European patent application EP-A-303 493.

The apparatus according to the invention preferably comprises a plate-fin heat exchanger in which the stripping passages alternate with condensing passages. Distribution and collection of fluids to the heat exchanger can thus be effected in a conventional manner. Suitable means for distributing fluids to and from such heat exchangers are well known in the art. See for example EP-A-0 469 780.

The method according to the invention may be used in any gas separation method in which there is a need to reboil part of a liquid fraction comprising at least two components of different volatility from one another by heat exchange with a condensing gas.

BRIEF DESCRIPTION OF THE DRAWINGS

The method and apparatus according to the invention will now be described by way of example with reference to the accompanying drawings, in which.

The drawings are not to scale.

DETAILED DESCRIPTION

Figure 1:
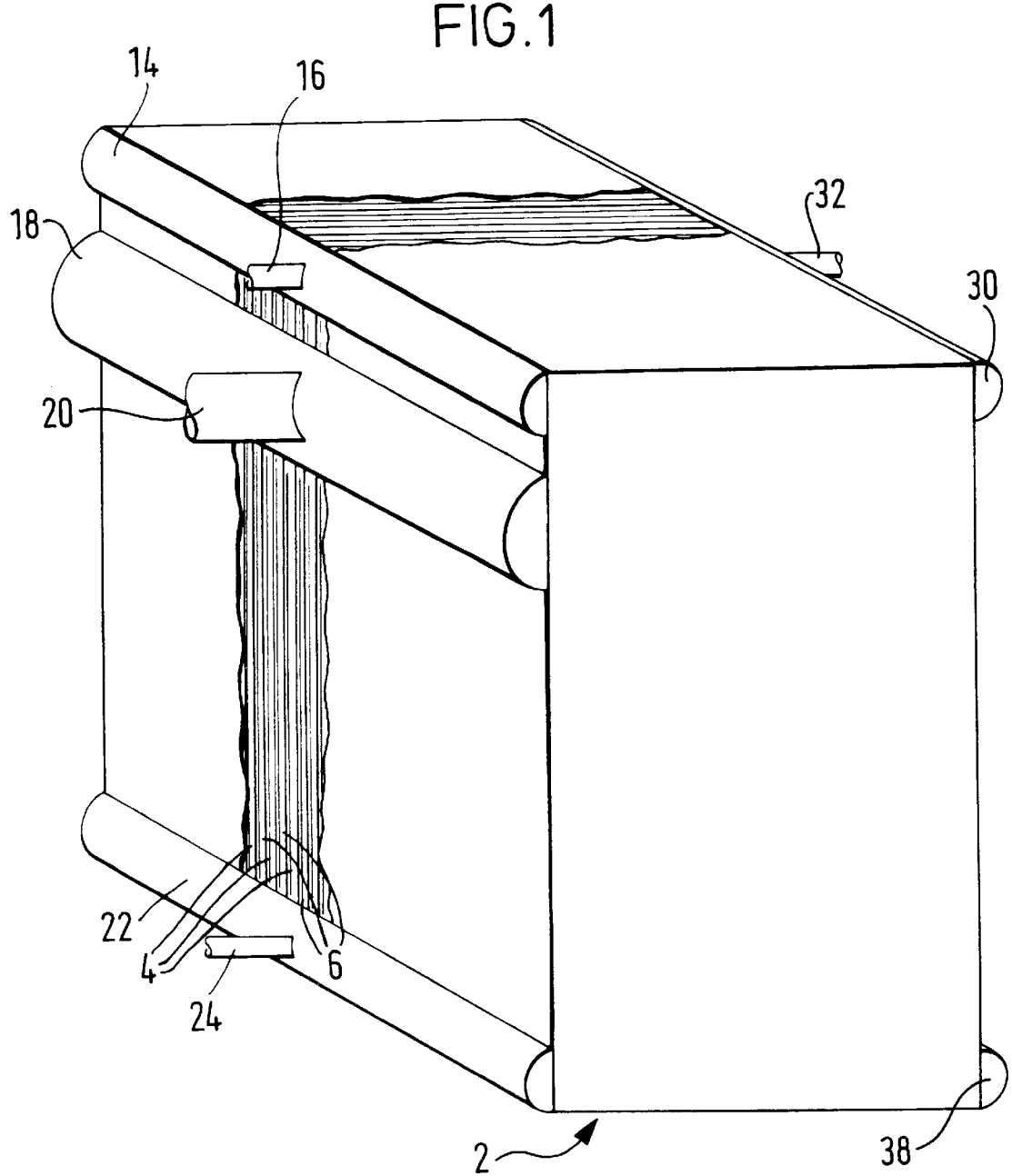
FIG. 1 is a schematic perspective view of part of a heat exchanger according to the invention.
Figure 2:
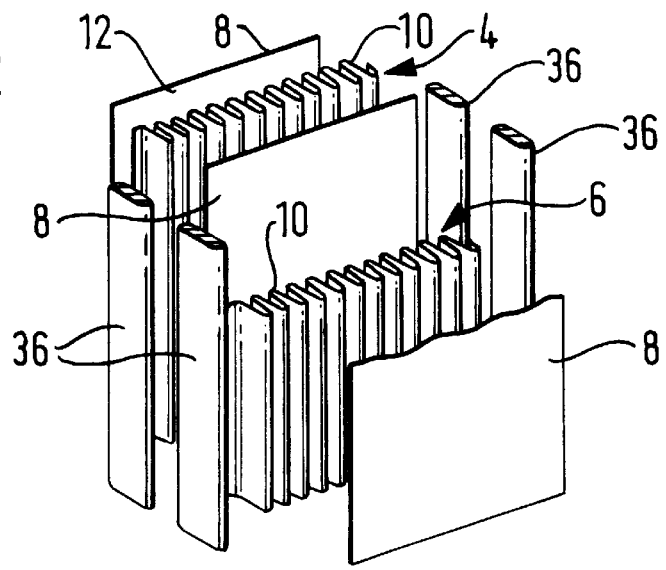
FIG. 2 is a schematic partial exploded perspective view, partly cut away, of the heat exchanger shown in FIG. 1.

Referring to FIGS. 1 and 2, there is shown a heat exchanger 2 comprising a set of boiling or stripping passages 4 for vaporising part of a flow of cryogenic liquid mixture and a set of passages 6 for condensing a cryogenic vapour in heat exchange relationship with the vaporising cryogenic liquid mixture. The passages 4 and 6 are preferably arranged alternately with one another and are defined by vertical heat conductive plates 8 (see FIG. 2). Each passage 4 and 6 is provided with fins of heat conductive metal in the form of corrugated sheets of metal 10 in heat conductive relationship with and joined to adjacent surfaces of neighbouring plates 8. The plates 8 have heat transfer surfaces 12 which in the case of those bounding the boiling passages 4 are preferably provided with porous surfaces which each encourage the homogeneous distribution of a film of boiling liquid on the surface. Each porous surface may thus be of the kind described in European patent application EP-A-303 493.

The heat exchanger 2 has at its top a header 14 for cryogenic liquid mixture part of which is to be vaporised. The header 14 communicates with the passages 4. The header 14 has an inlet pipe 16 which communicates with a source (not shown) oil the cryogenic liquid mixture. The heat exchanger 2 also has at its top region an inlet header 18 for vapour to be condensed . The inlet header 18 communicates with the passages 6. It also communicates with a source (not shown) of the vapour via an inlet pipe 20. Liquid condensate is withdrawn from the passages 4 at a bottom region of the heat exchanger 2 via an outlet header 22 having an outlet pipe 24. The boiling passages 6 communicate with two outlet headers 38 and 30. The outlet header 28 is contiguous to a bottom region of the passages 6 and is able to pass unboiled liquid to an outlet pipe (not shown). A liquid seal in the outlet header 38 may be preserved by means of a lute (not shown) or similar device. Alternatively, the residual unboiled liquid may be permitted to fall under gravity out of the bottom of the passages 6 and be collected in for example a sump (not shown) associated therewith. The outlet header 30 is contiguous to a top region of the passages 6 and is able to collect vapour and pass it to an outlet pipe 32.

The heat exchanger 2 is typically manufactured by making an assembly of sealing bars 36 (see FIG. 2), plates 8, fins 10 and the headers 14, 18, 22, 38 and 30 and vacuum brazing the assembly to form a unitary article. The header pipes may be welded or otherwise secured in position. The manufacture of such heat exchangers and their construction so as to ensure uniform distribution and collection of fluids are well known in the art and need not be described in further detail herein.

In operation, cryogenic liquid mixture is fed via header 14 to the top of the boiling passages 4. A film of the liquid flows down the respective heat transfer surfaces 12. The heat transfer surfaces are heated to above the boiling point of the liquid by condensing vapour flowing through the passages 6. The cryogenic liquid mixture is thus caused to boil as it descends the transfer surface. The mixture may typically comprise oxygen, nitrogen and argon. Of these components, nitrogen is the most volatile. Nitrogen therefore enters the vapour phase at a greater rate than either the oxygen or argon components. Accordingly, the descending cryogenic liquid mixture becomes progressively depleted of nitrogen. Thus the liquid leaving the passages 4 via the header 38 is depleted of nitrogen in comparison with the liquid entering the passages 4 at their top. Accordingly, the vapour formed by the liquid boiling at the bottom of the passages 4 is similarly relatively depleted of nitrogen in comparison with that formed by liquid boiling at the top of the passages 4. This vapour passes upwardly through the passages 4 countercurrently to the liquid flow with the result that there is mass exchange between it and the cryogenic liquid mixture which enhances the rate at which nitrogen is stripped from the liquid phase into the vapour phase. It is to be appreciated that this mass exchange between liquid and vapour phases flowing countercurrently to one another does not take place within a conventional reboiler-condenser.

The vapour which is used to heat the cryogenic liquid mixture enters the heat exchanger 2 via the header 18 flows down the passages 6 and is typically all condensed by heat exchange with the boiling cryogenic liquid mixture. The resulting condensate is withdrawn through the header 22.

Figure 3:
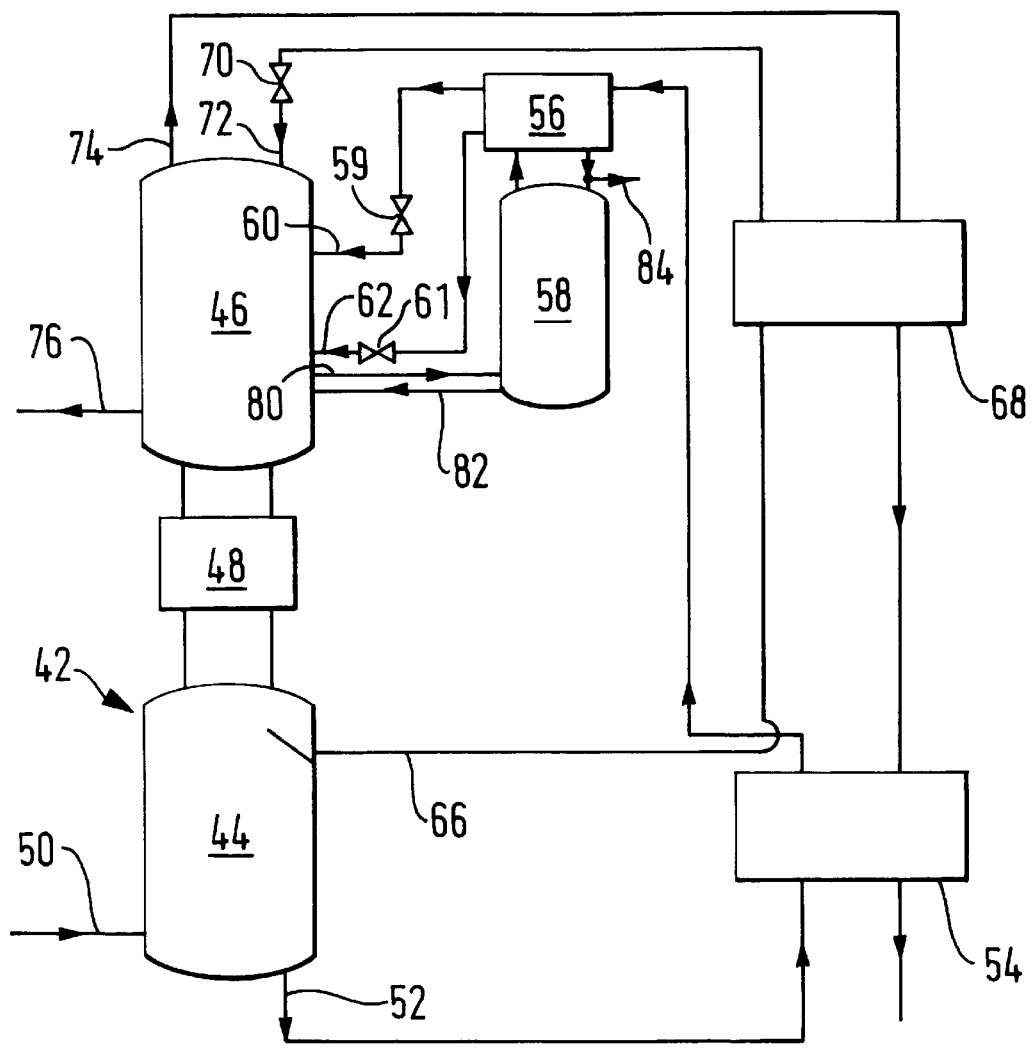
FIG. 3 is a schematic flow diagram of an air separation plant.

An example of the operation of the method according to the invention is now given with reference to FIG. 3 of the accompanying drawings. FIG. 3 shows a generally conventional air separation plant for separating air into nitrogen, oxygen and argon products. The plant includes a double rectification column 42 comprising a higher pressure rectification column 44 and a lower pressure rectification column 46. The columns 44 and 46 are linked by a condenser-reboiler 48 which provides liquid nitrogen reflux for the columns 44 and 46 and reboil for the lower pressure rectification column 46.

The higher pressure rectification column 44 has an inlet 50 for air that has been purified by removal of water vapour and carbon dioxide therefrom and has been cooled in a main heat exchanger (not shown) to a temperature suitable for its subsequent separation in the double column 42. In a manner well known in the art, the air admitted to the column 44 is separated into oxygen-rich liquid air and nitrogen vapour fractions. Oxygen-enriched liquid air is withdrawn from the bottom of the column 44 through an outlet 52 and is sub-cooled in a heat exchanger 54. The resulting sub-cooled liquid flows through the boiling passages of a condenser-reboiler 56 associated with an argon column 58 that is employed to produce a crude argon product from a fluid stream withdrawn from the lower pressure rectification column 46. The condenser-reboiler 56 takes the form of an apparatus according to the invention. It produces respectively a further enriched liquid air stream which flows through a Joule-Thomson valve 59 so as to reduce its pressure is introduced into the lower pressure rectification column 46 through an inlet 60 and a vapour stream which flows through an expansion valve 61 and is introduced into the rectification column 46 through an inlet 62.

Liquid nitrogen is withdrawn from the top of the column 44 through an outlet 66 and is sub-cooled by passage through a heat exchanger 68. The resulting sub-cooled liquid nitrogen is flashed through a Joule-Thomson valve 70 and enters the top of the rectification column 46 through an inlet 72.

The fluid entering the lower pressure rectification column 46 from the condenser-reboiler 56 is separated into oxygen and nitrogen fractions. Liquid oxygen is reboiled in the condenser-reboiler 48 by heat exchange with condensing nitrogen. A gaseous oxygen product is withdrawn from the column 46 through an outlet 74 and a gaseous nitrogen product is withdrawn from the top of the column 46 through an outlet 76. The nitrogen stream withdrawn through the outlet 76 is employed to provide cooling for the heat exchangers 68 and 54. The nitrogen product and the oxygen product also provide cooling for the main heat exchanger (not shown) in which the incoming air is cooled. (Although not shown, the oxygen product may, if desired, provide cooling for the heat exchanger 54.)

As is well known in the art, a local maximum argon concentration occurs in the vapour phase at an intermediate mass exchange level of the lower pressure rectification column 46. An outlet 80 from the column 46 is located at or close to such intermediate level and a fluid stream enriched in argon is withdrawn through the outlet 80 and is passed into the bottom of the rectification column 58 in which it is separated into oxygen-rich and argon-rich fractions. A liquid oxygen rich fraction is returned through a conduit 82 to the column 46. The argon-rich vapour fraction provides the necessary heating for the boiling passages of the condenser-reboiler 56 and is itself condensed. Some of the resulting condensed argon-rich liquid provides reflux for the rectification column 58 while another part of it may be taken as product via an outlet 84.

In a first example of the operation of the condenser-reboiler 56 in accordance with the invention, the oxygen-enriched liquid air stream supplied thereto has a mole fraction of oxygen of 0.38, a mole fraction of nitrogen of 0.61 and a mole fraction of argon of 0.01. The oxygen-enriched liquid air stream enters the boiling passages of the condenser-reboiler 56 at a temperature of 98.06K and a pressure of 5 bar. Its flow rate is 800 sm$^3$ per hr (standard cubic metres per hour). This stream is separated in the condenser-reboiler 56 into a liquid stream having a temperature of 100.32K, a flow rate of 419.6 sm$^3$ per hr and mole fractions of oxygen, nitrogen and argon of 0.55, 0.44 and 0.01 respectively. In addition, a vapour stream is produced at a temperature of 98.11K and a flow rate of 380.5 sm$^3$ per hr. The vapour stream has mole fractions of oxygen, nitrogen and argon of 0.19, 0.80 and 0.1 respectively.

The amount of separation of the oxygen-enriched liquid air that is carried out in the condenser-reboiler depends on the condensing duty in the condensing passages. In a second example, this condensing duty is increased with the result that the residual liquid stream issuing from the boiling passages of the condenser-reboiler 56 has a temperature of 102.80K, a flow rate of 288.3 sm$^3$ per hr and mole fractions of oxygen, nitrogen and argon of 0.71, 0.28 and 0.01 respectively. The boiled liquid stream leaving the boiling passages of the condenser-reboiler 56 has in this example a temperature of 98.19K, a flow rate of 511.8 sm$^3$ per hr and mole fractions of oxygen, nitrogen and argon of 0.196, 0.797 and 0.007 respectively.

One advantage of separating the oxygen-enriched liquid air stream in the boiling passages of the condenser-reboiler 56 is that the amount of separation work needs to be done in the lower pressure rectification column 46 may be reduced.

I claim:

1. An air separation plant comprising:
   a distillation column system having higher and lower pressure columns operatively associated with one another to separate air and thereby to produce an oxygen-rich liquid air fraction in said higher pressure column and a fluid enriched in argon in said lower pressure column, a distillation column connected to said lower pressure column and configured to separate a fluid stream composed of said fluid enriched in argon to produce an argon-rich fraction, and a condenser reboiler connected to said distillation column so that a stream of said argon-rich
   fraction is condensed and returned, at least in part, to said distillation column, thereby to reflux said distillation column;
   said condenser reboiler in communication with said higher pressure column to reboil a liquid stream composed of said oxygen-rich liquid air fraction, said condenser reboiler including:
     stripping passages each having at least one heat transfer surface to be heated to a boiling temperature causing the liquid stream to boil and to allow flow of liquid of said liquid stream in countercurrent mass exchange relationship with a vapour flow evolved from said liquid so that nitrogen is able to be progressively stripped from the liquid, and the said vapour flow is enriched in the direction of its flow in the nitrogen to produce enriched vapour, and the said liquid is depleted in its direction of flow of the nitrogen to produce depleted liquid;
     condensing passages arranged alternately with said stripping passages for condensing said argon-rich fraction against heating said at least one heat transfer surface to the boiling temperature;
     a first outlet for said enriched vapour; and
     a second outlet for said depleted liquid;
   said lower pressure column connected to said first and second outlet so that said enriched vapour and depleted liquid is introduced into said lower pressure column;
   two Joule-Thomson valves interposed between said first and second outlets and said lower pressure column to reduce pressure of said enriched vapor and depleted liquid prior to entry into said lower pressure column; and
   a subcooler interposed between said higher pressure column and said condenser reboiler for subcooling said liquid stream.

2. The apparatus as claimed in claim 1, wherein the stripping passages are arranged vertically.

3. The apparatus as claimed in claim 2, wherein the first outlet communicates with an uppermost region of the stripping passages and the second outlet communicates with a lowermost region of the stripping passages.

4. The apparatus as claimed in claim 1, wherein said heat transfer surface has irregularities which are able to provide nucleation sites for the formation of vapour bubbles.

5. The apparatus as claimed in claim 4, wherein the heat transfer surface comprises a porous metal coating of a kind in which the pores are open and communicate with one another.

6. A method of separating air comprising:
   separating the air in a distillation column system having higher and lower pressure columns operatively associated with one another to produce an oxygen-rich liquid air fraction in said higher pressure column and a fluid enriched in argon in said lower pressure column;
   separating a fluid stream composed of said fluid enriched in argon in a distillation column to produce an argon-rich fraction;
   subcooling a liquid stream composed of said oxygen-rich liquid air fraction and creating a flow of said oxygen-rich liquid air fraction, from said liquid stream, along at least one heat transfer surface;
   heating said heat transfer surface so as to cause vapour to be evolved from the flow of said oxygen-rich liquid air fraction;
   said heat transfer surface being heated by indirectly exchanging heat between said oxygen-rich liquid air fraction and said stream of said argon-rich fraction so as to cause said stream of said argon-rich fraction to condense;
   causing the vapour to flow in countercurrent mass exchange relationship with the flow of said oxygen-rich liquid air fraction so that nitrogen is progressively stripped from the flow of said
   oxygen-rich liquid air fraction such that the vapour flow is enriched in the direction of its flow in the nitrogen to form enriched vapor, and the flow of the oxygen-rich liquid air fraction is depleted in the direction of its flow of the nitrogen to produce a depleted liquid;

withdrawing from the mass exchange streams of the depleted liquid and the enriched vapour and introducing said mass exchange streams to the lower pressure column; and after condensing said stream of said argon-rich fraction, refluxing said distillation column with at least part of said stream of said argon-rich fraction.

7. The method as claimed in claim 6, in which the liquefied gas mixture comprises oxygen, nitrogen and argon.

8. The method as claimed in claim 6, wherein the said heat transfer surface is heated by condensing vapour.

9. The method as claimed in claim 6, wherein said heat exchange surface has irregularities which provide nucleation sites for the formation of vapour bubbles.

10. The method as claimed in claim 9, wherein the heat transfer surface comprises a porous metal coating of a kind in which the pores are open and communicate with one another, whereby to encourage a homogeneous distribution of a film of liquefied gas over the surface.

* * * * *